United States Patent [19] [11] 4,067,827
Takano et al. [45] Jan. 10, 1978

[54] PROCESS FOR PRODUCING EXPANDABLE BEADS OF POLYMETHYL METHACRYLATE

[76] Inventors: Yoshinari Takano, No. 265, Shiroko-cho, Suzuka, Mie; Keiji Fujita, No. 1-88, Hasedashi-cho, Yokkaichi, Mie; Yasuo Teraoka, No. 843-1, Oaza Kiwanami, Ube, Yamaguchi; Masahiro Nishida, No. 7-21, Kita Hamada-cho, Yokkaichi, Mie; Ryoichi Fujitani, No. 1290, Yamajo-cho, Yokkaichi, Mie; Yaichi Kuratomo, No. 2273-1, Ikuwa-cho, Yokkaichi, Mie all of Japan

[21] Appl. No.: 743,434

[22] Filed: Nov. 19, 1976

Related U.S. Application Data

[63] Continuation-in-part of Ser. No. 495,657, Aug. 9, 1974, abandoned.

[30] Foreign Application Priority Data

Aug. 11, 1973 Japan .................................. 48-89672

[51] Int. Cl.$^2$ ................................................ C08J 9/00
[52] U.S. Cl. ................................................. 260/2.5 B
[58] Field of Search ..................................... 260/2.5 B

[56] References Cited

U.S. PATENT DOCUMENTS

| 3,615,972 | 4/1971 | Morehouse et al. | .................. 156/79 |
| 3,736,273 | 5/1973 | Hatano et al. | .................. 260/2.5 B |

FOREIGN PATENT DOCUMENTS 698,626  11/1964  Canada ............................. 260/2.5 B Primary Examiner—John Kight, III
Attorney, Agent, or Firm—Phillips, Moore, Weissenberger, Lempio & Majestic

[57] ABSTRACT

A process for improving the production of polymethyl methacrylate beads or copolymeric methyl methacrylate and vinyl beads wherein the monomer is polymerized in the presence of a foaming agent and foaming agent stabilizer and within an atmosphere of inert gas, such as nitrogen, at a pressure of at least 4 kg/cm$^2$.G. The polymerizatin is pressurized after the reaction has proceeded to a conversion ratio of from 30 to 70%. The process essentially eliminates aggregation and "sticking together" of the beads produced thereby.

9 Claims, No Drawings

PROCESS FOR PRODUCING EXPANDABLE BEADS OF POLYMETHYL METHACRYLATE

RELATED APPLICATION

The present application is a continuation-in-part of Ser. No. 495657 filed Aug. 9, 1974, now abandoned, and the present inventors are co-inventors of the parent application.

DETAILED DESCRIPTION OF THE INVENTION

The present invention relates to a process for producing a polymer composition comprising methylmethacrylate as a main component. More particularly, the present invention relates to a process for producing expandable beads of polymethyl methacrylate by suspension polymerization, wherein the polymerization is characterized by the fact that a foaming agent and a stabilizer of said foaming agent are added to a reaction material prior to the polymerization reaction and further wherein the reaction is carried out under a pressure of at least 4 kg/cm$^2$.G. after a conversion ratio reaches 30 to 70% so as to prevent aggregation and blocking of beads, said pressure being effected by using an inert gas, such as nitrogen.

A polymer comprising methylmethacrylate as a main component, according to the present invention, is defined to include a homopolymer of methylmethacrylate and/or a copolymer of methyl methacrylate and a vinyl compound, such as styrene.

Generally, in the case of suspension polymerization, beads become very viscous during the reaction, especially at a conversion ratio of 30 to 70% and adhere to each other due to the collision of beads in the presence of polymerization heat, resulting in blocking. In some cases, the whole system becomes hard in a few minutes, and therefore a foaming agent is usually added to the reaction system after the conversion ratio reaches 30 to 70%.

Conventional expandable beads of methacrylates and methacrylate-vinyls have the common disadvantage of poor expansion ratios, non-uniformity in size, and a tendence for the beads to stick together, etc. The main reason for these phenomena is that when polymerization reaches its greatest intensity, i.e., about 30–70%, a flaming agent, such as for example, n-pentane which is dissolved in the starting mixture, is exuded onto the surfaces of the particles, so that the produced beads tend to stick together resulting in a lowering of the expansion ratio. In order to prevent the beads from sticking, it has been proposed to prepare polystyrene expandable beads by adding the foaming agent during the polymerization reaction or after completion of the reaction. However, the use of such techniques in a preparation of polystyrene beads can hardly be applied to the preparation of beads of methacrylates and methacrylate-vinyls because these plastics have a poor affinity to the foaming agent whereby said foaming agent is impregnated into the interior of the beads with the greatest of difficulty. It has also been proposed to utilize violent agitation of the molten materials during the preparation process in order to avoid the sticking together of the beads. In this manner, it has been possible to obtain very fine beads and avoid the sticking phenomena, but at the expense of reduced impregnation of the foaming agent into the bead interior. U.S. Pat. No. 3,615,972 teaches a method for producing expandable beads having a high expansion ratio. However, the method disclosed in that patent is quite complicated and must be carried out under carefully controlled conditions.

Conventionally, impregnation with a foaming agent is carried out by either adding gradully a foaming agent during polymerization (adding method - Japanese Patent Publication No. 3190/1958) or injecting a foaming agent under a high pressure after the completion of polymerization (injection method — Japanese Patent Publication No. 10628/1961). However, in the case of the preparation of beads of polymethyl methacrylate, it is difficult to thoroughly impregnate the beads with a foaming agent by conventional methods owing to the fact that methyl methacrylate has a low affinity for foaming agents.

It is therefore an object of the present invention to provide a process for producing expandable beads of polymethyl methacrylate without the above-mentioned defects in the conventional methods.

SPECIFIC DESCRIPTION OF THE INVENTION

When polymerization is carried out after adding a foaming agent and a preserver of said foaming agent to a monomer, the foaming agent dissolved in the monomer spreads out on the surfaces of beads at the time of bead formation and the surfaces become viscous. As a result, the beads are liable to adhere to each other and form a solid block. However, when nitrogen gas is applied to the polymerization system at a pressure of 4 kg/cm$^2$.G when the conversion ratio has reached about 30 to 70%, the beads can be obtained in a stable condition without adhering or forming blocks of beads. The present invention is based on the above discovery.

According to the present invention, a foaming agent preserver is dissolved in raw material monomer, and a polymerization initiator, a polymerization regulator and a foaming agent are added thereto. The mixture is added to an aqueous solution of a suspension agent and heated to 60° to 90° C in an autoclave. When the conversion ratio reaches 30 to 70%, nitrogen gas is applied at a pressure of 4 kg/cm$^2$.G or more, and the reaction is further continued at a temperature of 65°–90° C for a period of 4–10 hours under the stated pressure. Thus, it is possible to consistently obtain resin beads having a narrow distribution of bead size as shown by the undergoing experiments.

The monomer of the main raw material used for the present invention is methylmethacrylate. However, it is also possible to obtain excellent resin beads by adding 0–15 parts of styrene, and 1–15 parts of acrylate per 100 parts of methylmethacrylate.

N-pentane, isopentane, n-butane, propane, etc. are typical foaming agents. They are used in an amount of 5–15 parts per 100 parts of the raw material monomer.

As foaming agent preservant, low molecular polyethylenes having a molecular weight of 1,000–10,000, metallic salts of fatty acids such as sodium stearate, potassium oleate, etc. and fats and farty oils such as castor oil, tung oil, etc. are used in an amount of 0.5-3 parts per 100 parts of the raw material monomer. The foaming agent preservant has the effects of complementing the low affinity between methyl methacrylate resin and the foaming agent and therefore the internal cellular structure remains small when the beads are expanded.

As a suspension agent, water-soluble high molecular compounds, for example, polyvinyl alcohol, polycrylic acid, celluloses, polyvinyl pyrrolidine, etc. are preferable.

As a polymerization initiator, organic peroxides, for example, benzoyl peroxide are preferable.

As a polymerization regulator, tirchloroethylene or the like is used.

EXPERIMENTS

An aqueous solution of a suspension agent prepared by dissolving 30 g of polyvinyl alcohol in 12,000 g of water was placed in a 20-liter autoclave provided with an agitator.

Separately, 60 g of polyethylene (molecular weight - 1,500) was dissolved uniformly in a mixture of 5,400 g of methyl methacrylate, 300 g of styrene and 300 g of acrylate, to which 24 g of benzoyl peroxide, 120 g of trichloroethylene and 900 g of n-pentane were added. After this, the resultant mixture was put into said autoclave and heated to 78.5° C to start polymerization. Polymerizations were carried out for 8 hours under the following conditions.

Experiment No. 1 : Prior to polymerization, nitrogen gas was flushed into the autoclave.

Experiments Nos. 2–7: 30 minutes, 60 minutes, 90 minutes, 120 minutes, 130 minutes and 150 minutes after the starting of polymerization, respectively, the reaction system in the autoclave was pressed with nitrogen gas at a pressure of 6 kg/cm$^2$.G.

After completion of the reaction, the beads produced were heated at 160° C for 30 minutes, and then volatile loss was measured. The beads produced were also formed by subjecting to treatment with steam at 95° C for 3 minutes. After this, expansion ratio in volume was measured. The results obtained are shown in the following table.

| Experiment No. | Polymerization ratio (%) | Volatile loss (%) | Expansion ratio (time) |
|---|---|---|---|
| 1 | 0 | 4.5 | 7 |
| 2 | 8 | 5.6 | 16 |
| 3 | 16.5 | 8.3 | 27 |
| 4 | 28 | 10.4 | 45 |
| 5 | 41 | 12.0 | 75 |
| 6 | 65 | 12.1 | 70 |
| 7 | — | — | — |

The distrubutions of bead size were as follows.

| Experiment No. | Distribution of Bead Size (%) | | | |
|---|---|---|---|---|
| | <1 mm | 1–2 mm | 2–2.8 mm | >2.8 mm |
| 1 | 57.4 | 38.6 | 2.5 | 1.5 |
| 2 | 38.7 | 49.3 | 6.8 | 5.2 |
| 3 | 31.1 | 58.2 | 7.6 | 3.1 |
| 4 | 19.3 | 71.6 | 8.1 | 1.0 |
| 5 | 12.8 | 83.2 | 3.3 | 0.7 |
| 6 | 10.5 | 80.7 | 8.1 | 0.7 |
| 7 | — | — | — | — |

In Experiment No. 7, where the reaction system was pressed with nitrogen gas 150 minutes after the starting of polymerization, the beads were sticked together and aggregated.

The following non-limitative examples illustrate the present invention.

EXAMPLE 1

An aqueous solution of a suspension agent prepared by dissolving 30 g of polyvinyl alcohol (Gosenol GM-14 tradename, available from The Nippon Synthetic Chemical Industry Co. Ltd., Japan) in 12,000 g of water was placed in a 20-liter autoclave provided with an agitator.

Separately, 60 g polyethylene (molecular weight - 1,500) was dissolved uniformly in a mixture of 5,700 g of methyl methacrylate and 300 g of styrene, to which 24 g of benzoyl peroxide, 120 g of trichloroethylene and 900 g of n-pentane were added. After this, the resultant mixture was put into said autoclave and heated to 80° C to start polymerization. After 2 hours at 80° C, the reaction system was pressured with nitrogen gas at a pressure of 5 kg/cm$^2$.G and the reaction was further continued at 80° C for 6 hours. After completion of the reaction, the reaction product was cooled to a temperature below 40° C and taken out from the autoclave. It was found that the reaction product was spherical beads having a diameter of not more than 3 mm and 80% of the beads had a diameter of 1.0–2.0 mm. The amount of scale that adhered to the wall of the reactor and the propellers of the agitator was 0.7% by weight of the monomer initially charged into the autoclave.

The volatile loss of the produced beads after heating at 160° C for 30 minutes was 13.5%. Therefore, it was considered that more than 10 parts out of 15 parts of the foaming agent which was added to 100 parts of monomer was contained in the beads.

The beads were dried and molded, passing through preexpansion and aging procedures by steam. The expansion ratio of the molded beads was 60 times and perfect conglutination was achieved. Microscopic observation of a thin slice of the preexpanded beads (expansion ratio - 57 times) revealed that the slice has a very fine celled body having more than 100 cells/mm$^2$.

EXAMPLE 2

An aqueous solution of a suspension agent prepared by dissolving 20 g of hydroxymethyl cellulose in 12,000 g of water was placed in a 20 liter autoclave provided with an agitator.

Separately, 5,500 g of methyl methacrylate, 300 g of styrene and 200 g of butyl acrylate were mixed. As a foaming agent preservant, 90 g of tung oil was uniformly dissolved in the mixture. After adding 30 g of benzoyl peoxide, 180 g of trichloroethylene and 900 g of n-butane as a foaming agent, the mixture was put into said autoclave and heated to 80° C to start polymerization. After 2 hours, nitrogen gas was injected into the reaction system at a pressure of 8 kg/cm$^2$.G, and the reaction was further continued at 80° C for 6 hours.

After completion of the reaction, the reaction mixture was cooled to below 40° C and removed from the autoclave. There were obtained spherical beads having a diameter of 3 mm or less, and 80% of the beads had a diameter of 1.0–2.0 mm. The amount of the scale adhered on the reactor wall and the propellers of agitator was 0.85% of the monomer. The beads were dehydrated and dried. The volatile loss of the beads at 160° C was 12.8%.

The beads were then molded passing through preexpansion and aging procedure to yield a product (100 × 200 × 30 mm) having an expansion ratio of 75 times. The microscopic observation on a thin slice of the product revealed that the product had a fine celled body having more than 120 cells/mm$^2$. The results of mechanical tests of tensile strength, bending strength and compression and buffering strength test were similar to those of polystyrene foam. The smoke generated when burning was 1/20 of that of polystyrene foam.

We claim:

1. In a process for the production of expandable beads of polymerized methacrylates and methacrylate-vinyl mixtures from monomers thereof, by the process of dissolving a foaming agent preservant in the selected monomer, adding a polymerization initiator, polymerization regulator and a foaming agent to the solution, and then adding the thus obtained mixture to an aqueous solution of a suspension agent; the improvement comprising the steps of heating the suspended reaction mixture to a temperature of from about 60–90° C in an autoclave to commence the polymerization reaction, thereafter pressurizing the reaction mixture with an inert gas to a pressure of at least 4 kg/cm².G when the conversion ratio reaches about 30–70%, and then continuing the polymerization reaction at a temperature of from about 65°–90° C for a period from about 4–10 hours.

2. The process of claim 1, wherein said gas is nitrogen.

3. The process of claim 1 wherein the foaming agent is n-pentane, isopentane, n-butane or propane.

4. The process of claim 1 wherein the foaming agent is added in an amount of 5–15 parts per 100 parts of the monomer.

5. The process of claim 1 wherein said foaming agent preservant is selected from the group consisting of a low molecular polyethylene having a molecular weight of 1,000–10,000, a metal salt of fatty acid, and fats and fatty oils.

6. The process of claim 1 wherein the monomer is selected from the group consisting of methyl methacrylate, and mixtures of styrene, acrylate and methyl methacrylate.

7. The process of claim 1 wherein the polymerization initiator is an organic peroxide.

8. The process of claim 7 wherein the organic peroxide is benzoyl peroxide.

9. The process of claim 1 wherein the polymerization regulator is trichloroethylene.

* * * * *